E. DEDERICK.
Sulky Grain-Binder.

No. 222,986. Patented Dec. 30, 1879.

Witnesses:
Inventor:
Ezra Dederick
By Jas. B. Erwin
Atty.

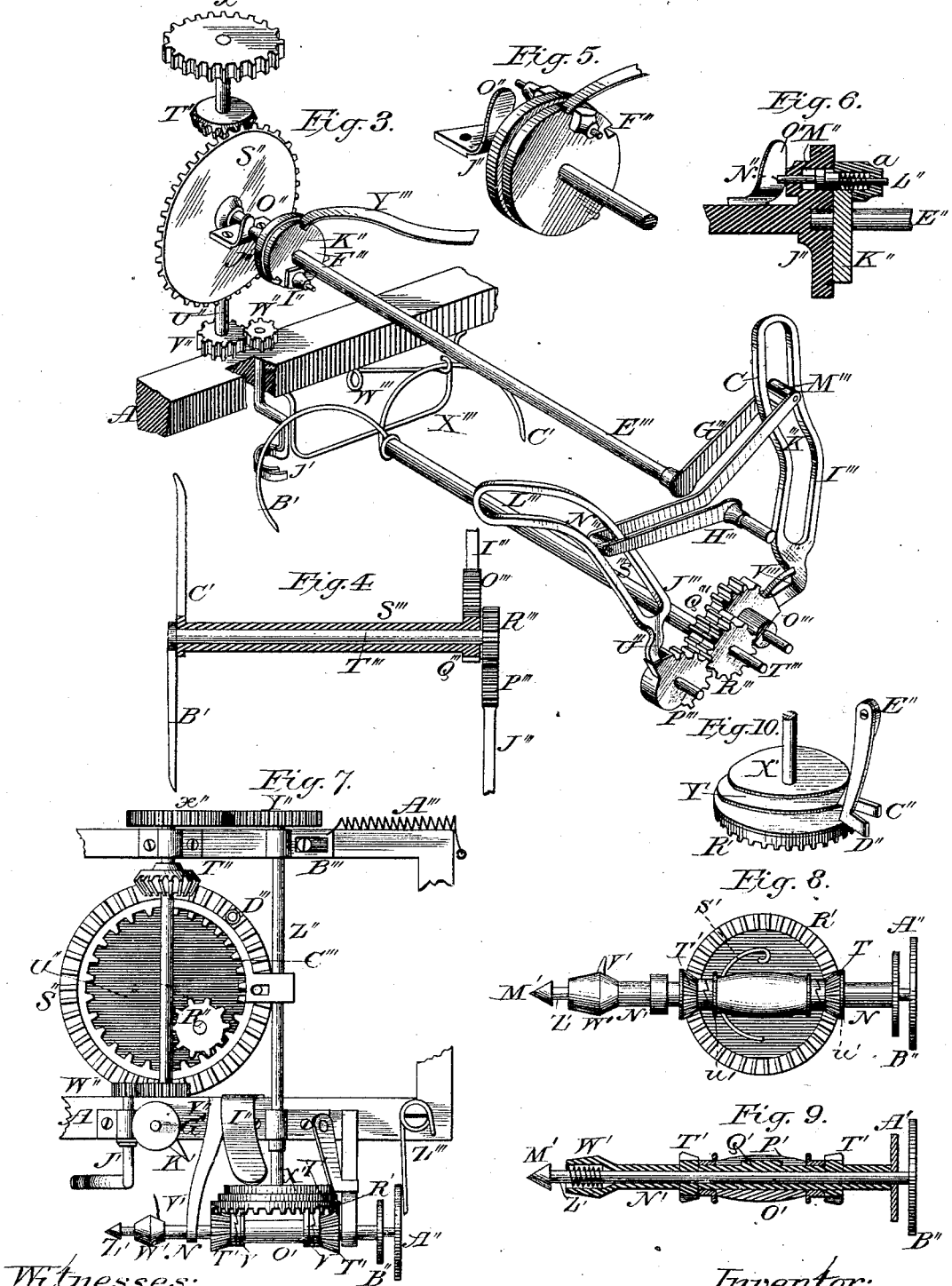

3 Sheets—Sheet 3.
E. DEDERICK.
Sulky Grain-Binder.
No. 222,986. Patented Dec. 30, 1879.
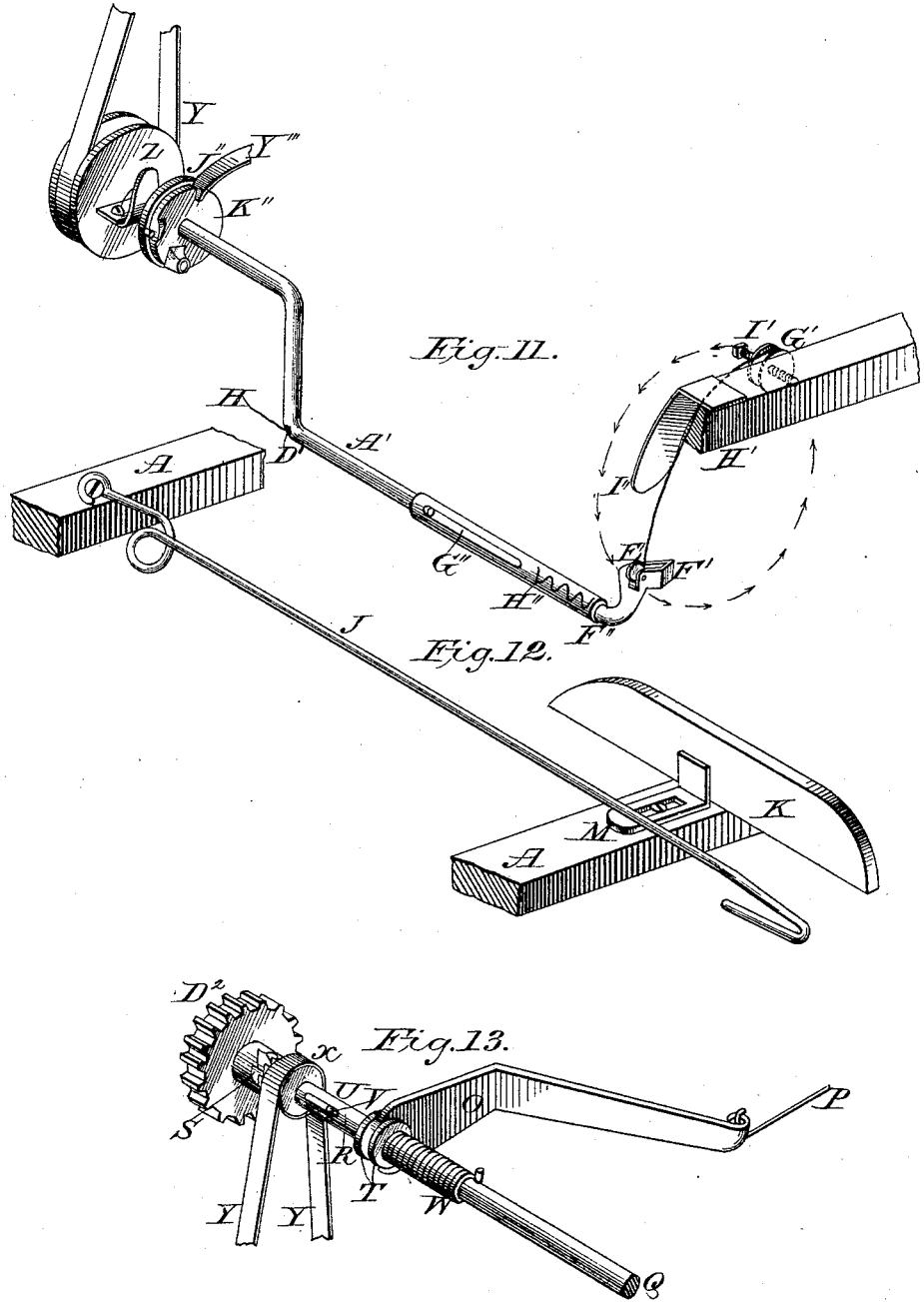
Witnesses:
Edwin G. Asmus.
Charles F. Hunter.
Inventor:
Ezra Dederick
By Jas. B. Erwin
Atty.

UNITED STATES PATENT OFFICE.

EZRA DEDERICK, OF MILWAUKEE, WISCONSIN.

IMPROVEMENT IN SULKY GRAIN-BINDERS.

Specification forming part of Letters Patent No. 222,986, dated December 30, 1879; application filed September 14, 1878.

*To all whom it may concern:*

Be it known that I, EZRA DEDERICK, of the city of Milwaukee, in the county of Milwaukee and State of Wisconsin, have invented certain new and useful Improvements in Sulky-Binders for Binding Grain with a Cord; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide an independent sulky-binder for binding grain with a cord, the grain having first been cut and deposited in gavels.

My machine is propelled by one or more horses from one gavel to another, when the gavels are picked up thereby and automatically bound.

The machine shown is arranged to be propelled in front of the horse, and is guided by a caster-wheel, which is operated by the driver.

Figure 1:
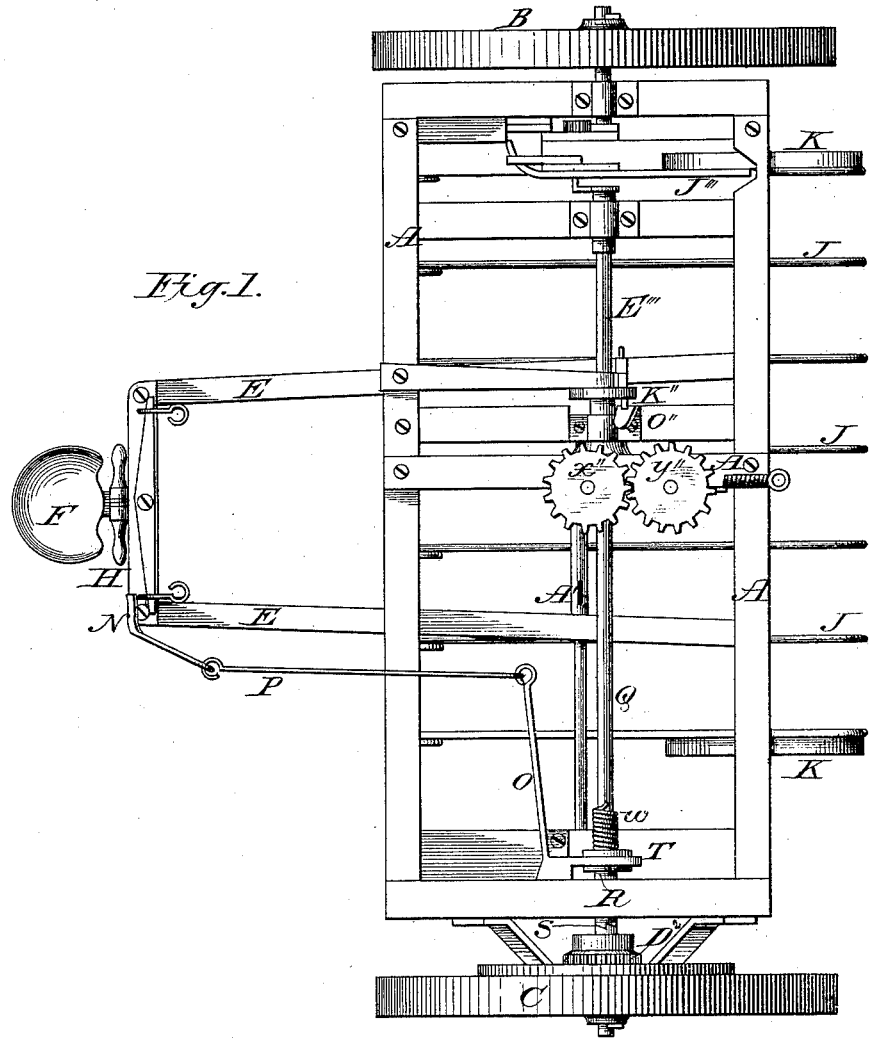
Figure 2:
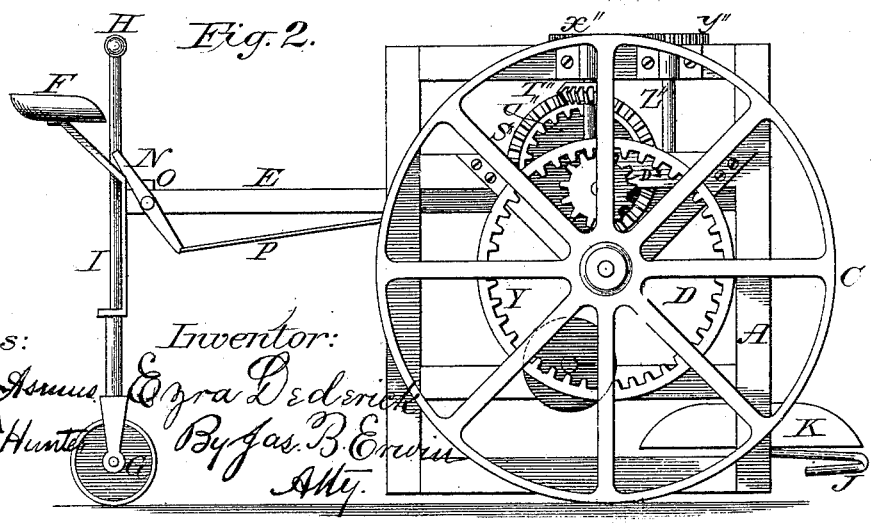

My invention is further explained by reference to the accompanying drawings, in which Figure 1 represents a top view of the machine. Fig. 2 is a side view of the same. Fig. 3 is a perspective view of the cord-twister, the gavel-compressor, and the devices for operating the same. Fig. 4 is a sectional view of the compressor. Fig. 5 is a perspective view of a coupling device. Fig. 6 is a sectional view of the coupling device. Fig. 7 is an end view of the binder, showing the device for tying the knot in the cord and cutting the same. Fig. 8 is a bottom view of the device for tucking under and tying the band. Fig. 9 is a sectional view of the device for tucking under and tying the band. Fig. 10 is a perspective view of a double-eccentric wheel and the arms which communicate motion from it to the tying device. Fig. 11 is a perspective view of the band-arm, the device by which it is coupled to and uncoupled from the continuous revolving shaft, and the device which retains the end of the cord while it is being carried under the gavel preparatory to tying the knot. Figs. 12 and 13 are detail views.

In the accompanying drawings, A represents a substantial frame, carrying the operating mechanism, and supported upon the wheels B and C.

The wheel C is provided with a gear-wheel, D, which operates the binding device. The wheel B simply supports one end of the frame.

E represents the thills, between which the horse is hitched, and by which the machine is pushed forward.

F is the driver's seat, supported by the rod I upon the caster-wheel G. The rod I extends above the seat, and is provided with handle H, by which the driver guides the machine by inclining the caster-wheel toward the right or left, as required.

J J are metallic rods or rake-teeth, for gathering up the gavels preparatory to binding. K K are flanges for guiding the gavel as it enters upon the teeth. The flanges are each provided with an L-shaped plate, M, which is secured to the frame A by a set-screw in such a manner that by loosening the screw the flanges may be set nearer to or farther from each other, or they may be inclined toward the right or left.

N is a foot-lever, by which the machine is thrown out of gear. It is connected with the elbow crank-lever O by the rod P. The lever O is attached by a bolt to the frame A.

When the machine is out of gear the pinion $D^2$, engaging with gear D, runs loosely upon the shaft Q. There is a sleeve, R, upon the shaft Q, which is provided with a ratchet-coupling device, S, which engages with a similar ratchet upon the side of the pinion $D^2$. The sleeve R has a lateral movement upon the shaft Q, and is moved toward the right and left by the elbow-crank lever O, which works between the flanges T of the sleeve. The sleeve R is also provided with a slot, U, corresponding in length to the lateral movement required, through which slot there is a pin, V, projecting from the shaft Q. There is a spiral spring, W, upon the shaft Q, which presses the sleeve R toward the pinion $D^2$, and thus keeps them coupled together, in which position the shaft Q is caused to revolve with the pinion $D^2$. By a forward pressure of the foot upon the lever N a lateral movement is communicated to the sleeve R, which is thrown back from the pinion D², and the coupling is released and the motion of the machinery stopped.

There is a band or chain wheel, X, attached to the sleeve R and revolving with it. The band-wheel communicates motion through band Y (see Fig. 13) to the pulley Z, which thus operates the band-arm A'. The office of the band-arm is to carry the band around the gavel previously picked up by the rods J and held between the arms B' C' of the compressor. (See Fig. 3.) The cord which forms the band enters the band-arm through the opening D', and passes on through a hollow in the center of the arm to the pulley E', over which it runs.

There is a wedge-shaped projection, F', in front of pulley E', which separates the disks G' as the band-arm describes the circle shown by the arrows, when the end of the cord H' is engaged between the disks G', which are held firmly together against the cord by the spiral springs I' on each side of them. The end of the cord being thus held, the band-arm carries the cord beneath and around the bundle, bringing the ends of the band together, when they are caught by the twisting-claws and twisted several times around. While in the act of twisting the cord is brought in contact with the knife K', which cuts off the band. When the cord is thus twisted a hard knot is formed by the devices shown in Figs. 8 and 9, which consist of shaft Z', provided with knob M', sleeve N', which surrounds the shaft L', and sleeve O', which surrounds and has a lateral movement upon the sleeve N'. The sleeve O' has a slot, P', for the accommodation of a bead, Q', which extends through it from the sleeve N', thus causing the sleeve, when it revolves, to revolve the sleeve N', which it surrounds. The sleeve O' has a free lateral movement upon the sleeve N', and is caused to vibrate backward and forward by the cam S' with each revolution of the wheel R'.

T' T' are pinions, which revolve loosely upon the shaft N' in opposite directions, motion being communicated to them, respectively, from the opposite sides of the wheel R'.

The sleeve O' is provided with a coupling-ratchet device, U', at each of its ends, which alternately engage in a similar coupling device on the sides of the pinions T' as the sleeve vibrates backward and forward upon the sleeve N'. Thus when the sleeve is thrown toward the right by the cam S' it engages with the right pinion and is revolved forward. When the sleeve is thrown toward the left it engages with the left pinion, and is revolved in an opposite direction, carrying with it the shaft Z' and sleeve N', thus causing them to revolve alternately forward and backward with each revolution of the wheel R'.

When the sleeve N' revolves forward the hook V', upon its end, engages with the ends of the band at the point where they are twisted together. Thus the band is drawn up into a loop and wound around the end of the sleeve N', while the sleeve N' and shaft Z' are moved to the right in the following order: First, the sleeve N' moves toward the right, when the cord, which has previously engaged in the hook V', is caused to slide from the knob W' off upon the shaft Z', around which it is partially wound, when the shaft Z' also moves toward the right, when the ends of the cord are caught between the end of the sleeve N' and the knob M' of the shaft, whereby it is drawn partially into the end of the sleeve N', when, by the action of the bundle as it drops from the compressor, the twisted ends of the band thus held are drawn through the loop in the cord which is formed by winding upon the sleeve N', and the knot is complete.

X' and Y' are cams upon the upper side of the wheel R', and are secured to and revolve with it, their office being to communicate the lateral motion described to the shaft Z' and sleeve N', which end is accomplished as follows: The shaft Z' and sleeve N' are each provided with disks A'' and B'', and the cams X' and Y' as they revolve press, respectively, against the L-shaped arms C'' and D'', causing them to vibrate upon the bolt E'', from which they are suspended, and as they are thus pushed forward they respectively press against the disks A'' and B'', thereby communicating the said described lateral movement to the shaft Z' and sleeve N'.

As the binding-arm A' describes a circle around the bundle, it becomes necessary to contract it, that the projecting end may pass the gearing and enter beneath the twisting-claws J', and then extend itself again to its former length, to accomplish which purpose the arm is constructed in two pieces. The outward end, F'', being made hollow, overlaps the other part and moves freely in a lateral direction upon it. This end F'' is provided with a slot, G'', through which a pin is inserted into the inner shaft, A', which limits and checks the lateral movement of the outside piece to the length of the slot G''.

There is a spiral spring, H'', within the piece F'', which presses against the end of the arm A', and keeps the binding-arm extended to its full length, except when it is contracted to pass the gears. The band-arm is thus contracted by its contact with the guard-flange I'', which flange inclines gradually outward from the gears, and as the end of the band-arm presses downward against it the spiral spring H'' is compressed and the arm contracted until it passes the guard, when it is again thrown out to its full length by the spring, as stated.

The binding-arm A' is connected with the shaft of the pulley Z by a coupling device, which is automatically coupled and uncoupled at each revolution of the pulley, the arm performing only one-half as many revolutions as the pulley. While the pulley Z has a continuous motion, the band-arm is coupled to and moves with it only through each alternate revolution. The disk J'' is attached to the shaft of the pulley Z and revolves with it. The cap K″ is attached to the band-arm in the same manner, and the two smooth surfaces of the disks run closely together, as shown in Fig. 6.

The disk K″ is provided with a small pin, L″, by which the two disks are coupled together in the following manner: There is a spiral spring, a, surrounding the pin L″, which presses the pin firmly against the face of the disk J″. The disk J″ is provided with a recess, m″, corresponding in size to the head of the pin L″, at the same distance from the center of the disk, so that as the disk J″ revolves the recess is brought in front of the pin L″, when the pin is instantaneously thrown into it, and the two disks are coupled, and thus revolve together. The recess m″ is provided with a pin, N″, which has a lateral movement therein.

The disks are uncoupled as follows: When the disks have first been coupled together, as described, and have thus nearly completed one revolution, the projecting end of the pin N″ strikes against the inclined flange O″, and is thereby pressed in against the end of the pin L″, thus crowding the pin L″ out of the disk J″, thus leaving the disk uncoupled, when the disk K″ remains stationary until the disk J″ performs another revolution, when, as the recess m″ again comes opposite to the pin L″, the disks are recoupled, as before described.

The shaft Q communicates motion from the pinion D² to the pinion R″, and the latter is geared with the pinion S″, which, in turn, is geared to and communicates motion to the beveled gear T″, from which motion is communicated by the shaft U″ to the pinion V″, geared with the gear W″, attached to and revolving the twisting-claws J′.

The shaft U″ extends through and above the gear T″, and communicates motion to the pinion X″, which gears with the pinion Y″. The pinion Y″ communicates motion through the shaft Z″ to the wheel R′, attached, with its cams X′ and Y′, to the lower end of the shaft.

The pinion Y″ is thrown in and out of gear with the pinion X″ with each revolution of the wheel S″ by the joint action of the wheel S″ and the spiral spring A‴, the shaft Z″ being provided with a movable bearing, B‴, which is drawn back, carrying the shaft Z″ and pinion Y″ by the action of the spring A‴, and the pinions X″ and Y″ thus thrown out of gear, and the binding devices beneath allowed to remain at rest. The shaft Z″ is provided with a projecting cam-plate, C‴, which engages with a projecting pin, D‴, upon the wheel S″ at each revolution of the same, causing the shaft to assume a vertical position, thereby throwing the pinions X″ and Y″ in gear, when the binding device is again set in motion.

Motion is communicated from the shaft of the beveled gear-wheel S″ to the shaft E‴ by the coupling F‴, which coupling is a duplicate of the one which runs the band-arm, and its several parts are indicated by the same reference letters. Each alternate revolution only of the wheel S″ is communicated to the shaft E‴. Said shaft is provided with two crank-arms, G‴ and H‴, which, respectively, extend through and operate the arms I‴ and J‴, which arms are provided with cam-slots K‴ and L‴ for their reception. The ends of the arms G‴ and H‴ are each provided with antifriction rollers M‴ and N‴. Thus, as the shaft E‴ revolves the crank-arms G‴ and H‴ cause the arms I‴ and J‴ to vibrate in opposite directions, passing and repassing each other with each revolution of the shaft. The arms I‴ and J‴ are each provided with segmental gears O‴ and P‴, which are respectively geared to pinions Q‴ and R‴. The gear Q‴ is attached to the hollow shaft S‴. The gear R‴ is attached to the shaft T‴, which extends axially through the hollow shaft S‴. Thus, as the arms I‴ and J‴ vibrate backward and forward in the manner described, they cause the shafts S‴ and T‴, respectively, to perform a partial revolution in opposite directions, one within the other, thus bringing the compressing-arms B′ and C′, which are, respectively, attached to the shafts S‴ and T‴, together firmly around the gavel, as hereinbefore mentioned.

To accommodate the compressing-arms to gavels larger than the ordinary without danger of breaking the machine, a flexible joint-connection is made between the arms I‴ and J‴ and the gears O‴ and P‴, to which they are respectively attached. The connection is made sufficiently rigid, however, to communicate the required pressure to the gavel by the stiff metallic springs U‴ and V‴, which are inserted in the gears O‴ and P‴, respectively, below the pivots, and extend backward against the inner side of the arms. Thus, as the compressing-arms are brought as near together as is possible around a large bundle, and their motion is checked, the arms I‴ and J‴ turn upon their pivots, compressing the springs U‴ and V‴ until shaft E‴ completes its revolution, when the compressing-arms are thrown open.

W‴ is a metallic spring, the office of which is to throw back the compressing-arm C′, which, acting through the intermediate connections, causes the disk K″ to perform a partial revolution forward after it has been uncoupled from the disk J″, so that after the disk J″ has performed a revolution the point of recoupling will occur past the flange O″, at which point the uncoupling-pin N″ will freely move back, giving place to the coupling-pin L″, which is thrown into the recess m″ as soon as it comes opposite to it, when both disks again move together, as hereinbefore described.

Fig. 4 shows a sectional view of the shafts S‴ and T‴ and their immediate connections.

X‴ is a former consisting of a substantial rod firmly bolted at each of its ends to the frame A, and serving to shape and compress the bundle as it is drawn up against it by the compressing-arms, and also to prevent the straw from getting into the twister and knotting device.

The spring-pawl Y''' holds the disk K'', after it is uncoupled, until the disk J'' has moved past the point of recoupling referred to, when the spring-pawl is thrown up and released from the disk K'' by a projecting pin from the side of the moving disk J'', when, by the action of the spring W''', the disk K'' is thrown forward, as before explained, to the point of recoupling.

Z''' is a metallic spring, which is attached to the frame A at one end. The other end of the spring presses against the disk A'', the office of which spring is to throw the sleeve N' and shaft L' back toward the left as soon as released from the pressure of the arms C'' and D''.

Having thus described my invention, what I claim as new, and desire to secure by Letters Patent, is—

1. In a grain-binder, the combination, with the frame A, supported by wheels and provided with the thills E, of the gathering-teeth J and adjustable flanges K, for guiding the gavels to the binding mechanism, said flanges being attached to the frame by the L-shaped slotted adjustable plates M with set-screws, substantially as described, and for the purpose set forth.

2. The combination, with the crank-arms G''' H''' on the shaft E''', of the slotted arms I''' J''', segmental gears O''' P''', and springs U''' and V''', substantially as and for the purpose set forth.

3. The combination, with the gears X'' Y'', and their shafts, of the sliding box B''', spiral spring A''', cam-flange C''', and gears T'', V'', and W'', for operating the cord-claw, substantially as described, and for the purpose set forth.

4. The combination of the eccentrics X' and Y' with the arms C'' and D'', respectively, and flanges A'' B'' of the knotter-shafts, substantially as shown.

5. The shaft L', provided with knob M', disk A'', shaft N', provided with knob W' and hook V', bead Q', and disk B², and sleeve O', provided with ratchet-couplings W' and gears T', all combined and arranged substantially as described, and for the purpose specified.

6. The combination of the arm C'' with the eccentric X' and the disk A'', substantially as and for the purpose specified.

7. The combination of the arm D'' with the eccentric Y' and the disk B'', substantially as and for the purpose specified.

8. The combination of the coupling device K'' with the band-arm A' and the shaft of the pulley Z, substantially as and for the purpose specified.

9. The band-arm consisting of shaft A' and shaft F''', provided with slot G'', spiral spring H'', pulley E', and wedge F, all combined and arranged substantially as shown.

10. The combination of the telescopic band-arm A' with the guide-plate I'', substantially as described, and for the purpose set forth.

11. The combination, with the shaft S''', carrying the pinion Q''' and compressing-arm C', of the shaft T''', carrying the pinion R''' and compressing-arm B', substantially as described, and for the purpose set forth.

12. The combination of the wheel D, pinion D², and shaft Q with the pinion R'', beveled gear-wheel S'', gear T'', shaft V'', pinions X'' Y'', and pinion W'', provided with the twisting-claws J'', substantially as described, and for the purpose set forth.

In testimony that I claim the foregoing as my own I affix my signature in presence of two witnesses.

EZRA DEDERICK.

Witnesses:
 K. SHAWVAN,
 JAS. B. ERWIN.